United States Patent [19]

Underwood et al.

[11] Patent Number: 4,986,368

[45] Date of Patent: Jan. 22, 1991

[54] PLANTING APPARATUS

[76] Inventors: John P. Underwood, 42 W. Vogel, Phoenix, Ariz. 85021; Dan B. Poole, 14645 N. 15th Ave., Phoenix, Ariz. 85023

[21] Appl. No.: 270,623

[22] Filed: Nov. 14, 1988

[51] Int. Cl.⁵ .............................................. E21B 10/44
[52] U.S. Cl. ...................................... 172/394; 172/25; 172/430; 111/14
[58] Field of Search .................... 172/41, 111, 25, 430; 175/394; 111/116, 89, 99, 4; 408/202

[56] References Cited

U.S. PATENT DOCUMENTS

| | | | |
|---|---|---|---|
| 91,387 | 6/1888 | Vaughan. | |
| 431,455 | 7/1890 | Eagleston | 175/394 |
| 515,731 | 2/1894 | Daugherty | 175/394 |
| 965,097 | 7/1910 | Menzel. | |
| 1,430,951 | 10/1922 | Cranmer. | |
| 1,603,337 | 10/1926 | Gury. | |
| 1,639,939 | 8/1927 | Grothe. | |
| 1,856,065 | 5/1932 | Austin. | |
| 2,028,483 | 1/1936 | Van Yahres | 55/18 |
| 2,231,864 | 2/1941 | Abel | 77/55 |
| 2,634,104 | 4/1953 | Clayton et al. | 255/69 |
| 2,779,259 | 1/1957 | Kelsey | 172/41 |
| 2,846,192 | 8/1958 | Ostling | 255/69 |
| 3,356,168 | 12/1967 | Johnson | 175/394 |
| 3,444,940 | 5/1969 | Thomas et al. | 175/394 |
| 3,485,052 | 12/1969 | Turzillo | 175/394 X |
| 4,039,266 | 8/1977 | O'Connell | 408/202 |
| 4,742,656 | 5/1988 | Farmer | 175/394 |
| 4,807,710 | 2/1989 | Greeley | 172/111 |

FOREIGN PATENT DOCUMENTS

| | | | |
|---|---|---|---|
| 1480255 | 4/1967 | France | 175/394 |
| 2466 | of 1870 | United Kingdom | 175/394 |

Primary Examiner—Richard J. Johnson
Attorney, Agent, or Firm—Don J. Flickinger; Jordan M. Meschkow

[57] ABSTRACT

An auger-like apparatus for boring planting holes includes an elongate shaft carrying a spiral blade or screw flight at its lower end. Means are provided at the outer end of the cutting edge to protect a sprinkler conduit or hose which may be contacted by the apparatus. In one embodiment, the outer end of the cutting edge is rounded and tapered into the peripheral edge of the screw flight. In a second embodiment, a guard extends between the outer edge of the cutting edge and a subsequent spiral of the screw flight. The shank may be graduated and support a slidable snap ring. A graduated tape mechanism is also provided to gauge the spacing of the plant bores.

3 Claims, 1 Drawing Sheet

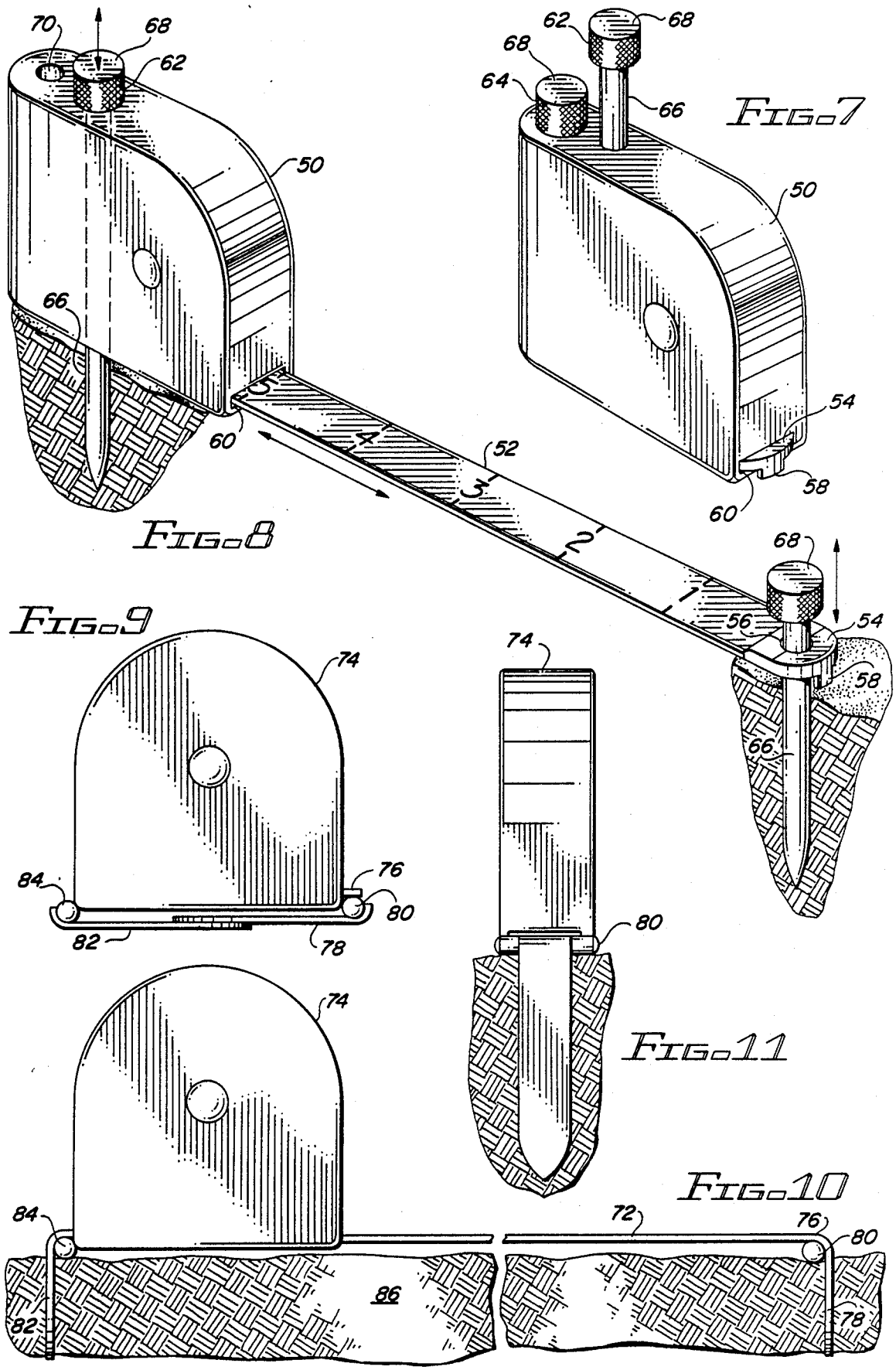

PLANTING APPARATUS

BACKGROUND OF THE INVENTION

This invention relates generally to an apparatus for boring holes in the ground into which plants may be set. More particularly, this invention relates to an auger-like apparatus including an elongate shank carrying a spiral blade at its lower end which includes means for protecting a sprinkler conduit, hose, etc., which may be contacted by the blade. Still more particularly, the invention relates to a planting system including an auger-like apparatus for boring holes of a desired diameter and depth, and measuring means for providing a uniform spacing between such holes.

Outdoor planting generally requires the production of a hole or bore in the ground into which the plant is set. Therefore, it should be apparent that this task of producing holes could become very time consuming when contemplating the planting of a flower bed or garden including numerous small plants. The consistency of spacing between holes, and the depth and diameter of each hole become of immediate concern.

Devices for boring holes such as augers are well known. They often consist of, in part, a shank which supports a spiral blade or screw flight at its lower end. The shank is rotated either manually or by motor for the purpose of boring a hole in ice, earth, etc. Exemplary devices are shown and described in U.S. Pat. Nos. 2,634,104; 2,846,192; and 3,444,940.

In a garden or other cultivated area, it would not be uncommon to encounter submerged plastic or rubber sprinkler conduits or hoses. If such conduits or hoses were contacted by prior art augers, they would be severely damaged and would probably require replacement.

SUMMARY OF THE INVENTION

It is an object of the present invention to provide an improved auger-like apparatus for boring planting holes.

It is a further object of the present invention to provide an improved planting system for producing planting holes of consistent depth, diameter and spacing.

It is a still further object of the present invention to provide an auger-like apparatus equipped with means for protecting underground conduits, hoses, etc.

According to a broad aspect of the invention there is provided an apparatus for boring holes in the ground in an environment containing submerged conduits, hoses and the like. The apparatus comprises an elongate shank carrying a spiral blade or screw flight at its lower end. Means are provided for protecting a sprinkler conduit or hose which may be contacted by the apparatus. Planting systems including this auger-like apparatus would also include additional means for gauging the spacing of the holes.

BRIEF DESCRIPTION OF THE DRAWINGS

The above and other objects, features and advantages of the present invention will be more clearly understood from the following detailed description taken in conjunction with the accompanying drawings, in which.

BRIEF DESCRIPTION OF THE PREFERRED EMBODIMENT

Figure 1:
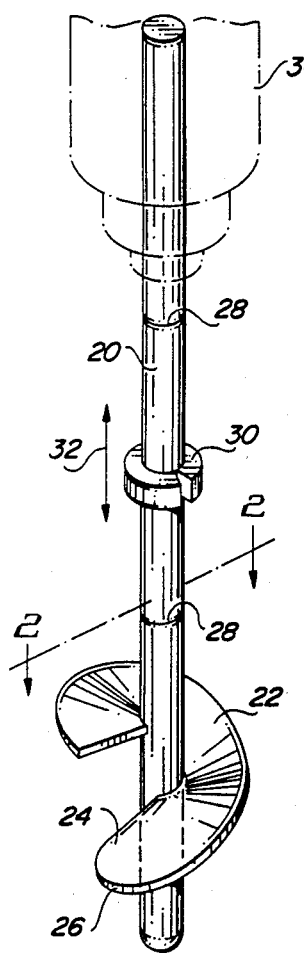
FIG. 1 is a perspective view of an inventive auger-like apparatus; of the instant invention
Figure 2:
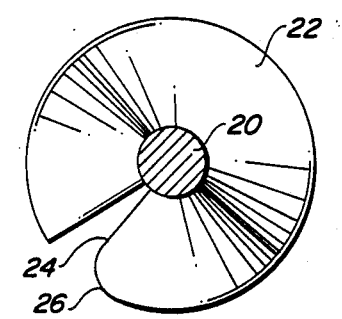
FIG. 2 is a horizontal sectional view taken along the line 2—2 in FIG. 1.
Figure 3:
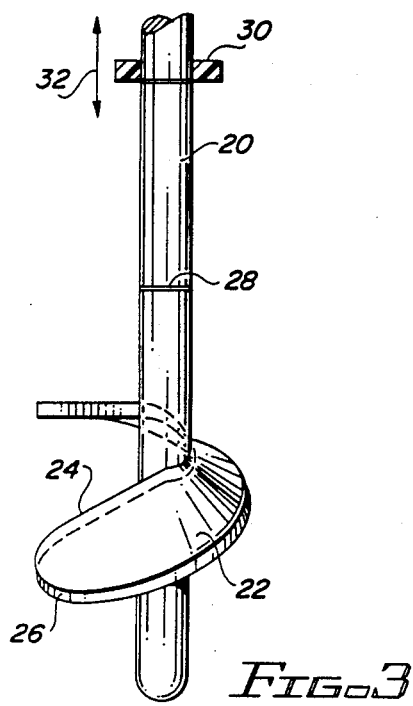
FIG. 3 is an enlarged elevational view of the lower portion of the apparatus shown in FIG. 1.

Referring to FIGS. 1, 2 and 3, there is shown a first embodiment of the inventive auger-like planting apparatus. The apparatus includes a shank 20 having a spiral blade or screw flight 22 fixedly coupled to a lower end thereof. Spiral blade 22 has a substantially radially extending cutting edge 24 which terminates with a rounded outer portion 26. Portion 26 is tapered in elevation from the end of cutting edge 24 to form a transition between cutting edge 24 and the full thickness of the blade.

As can be seen, shank 20 is provided with graduations 28 which may be in any desired increments (e.g. inches). A snap ring 30 is slidably mounted on shank 20 and is movable along the shank as indicated by arrow 22. Graduations 28 and snap ring 30, which may be placed at any selected graduation 28, function as a guide means for the depth to which the hole is to be drilled.

In operation, the inventive auger-like apparatus is rotated, as for example by an electric drill motor for the purpose of boring holes into the earth. For simplicity, only the chuck 34 of the electric drill motor is shown in dotted lines in FIG. 1.

As stated previously, the purpose of the holes to be drilled is for setting outdoor plants, and especially contemplated is a flower bed of numerous smaller plants. Consistent therewith, blade 22 has a preferred diameter in the range of approximately two to four inches. In many such flower beds or gardens, a sprinkler hose or conduit may already be in place and submerged. Should blade 22 encounter such a sprinkler hose or conduit during the boring process, relatively thick rounded portion 26 of blade 22 will cause the hose or conduit to be pushed aside as opposed to being cut by sharp edge 24.

Figure 5:
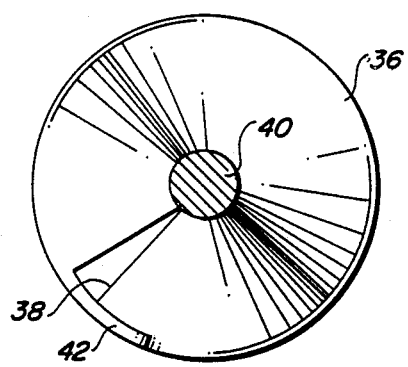
FIG. 5 is a horizontal sectional view taken along line 5—5 in FIG. 4.
Figure 4:
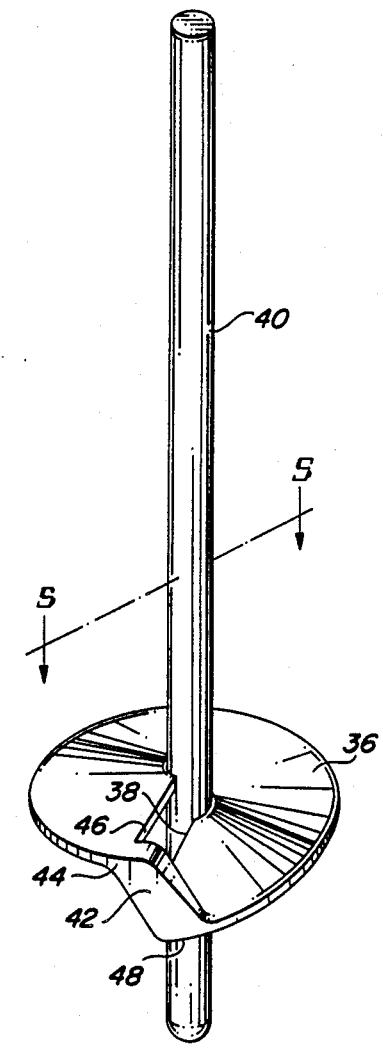
FIG. 4 is a perspective view of an alternate embodiment of the inventive auger-like apparatus.
Figure 6:
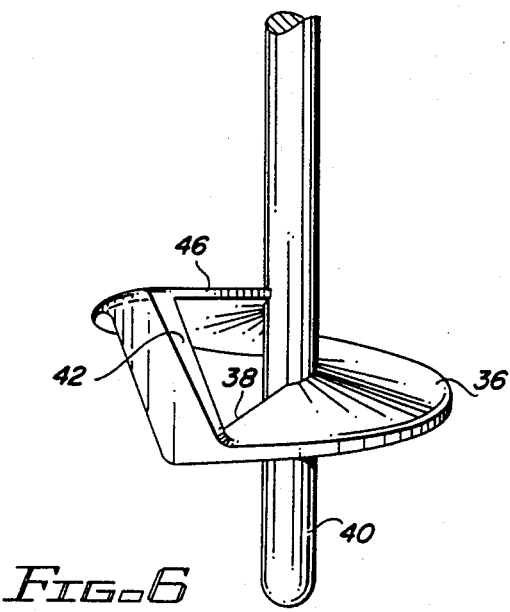
FIG. 6 is an enlarged elevational view of the lower portion of the inventive apparatus shown in FIG. 4.
Figure 12:
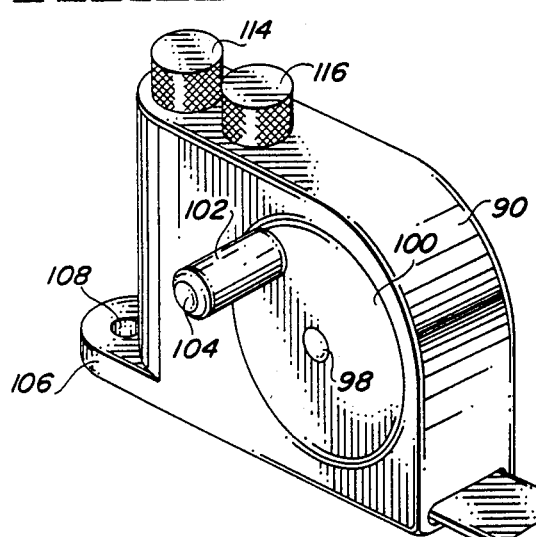
Figure 13:
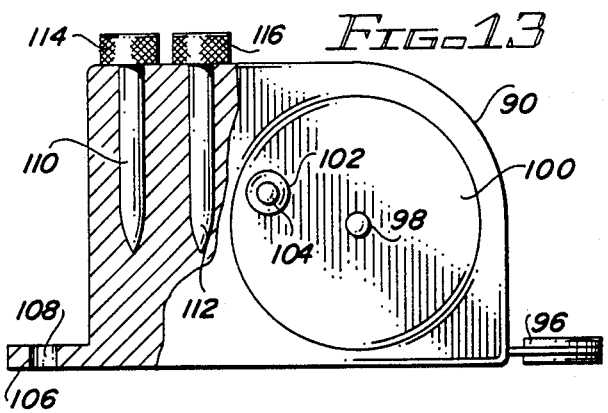
Figure 16:
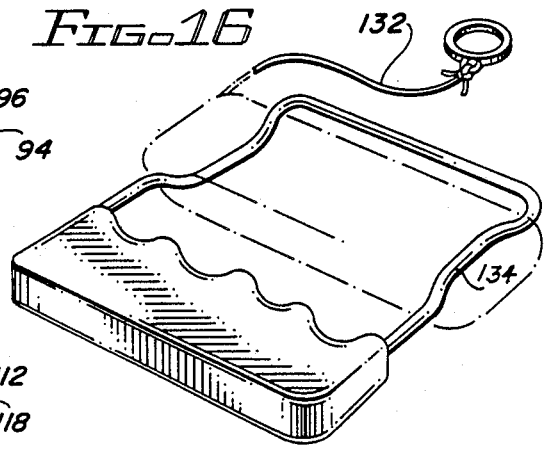
Figure 14:
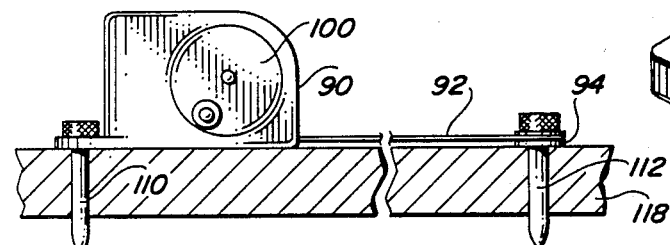
Figure 15:
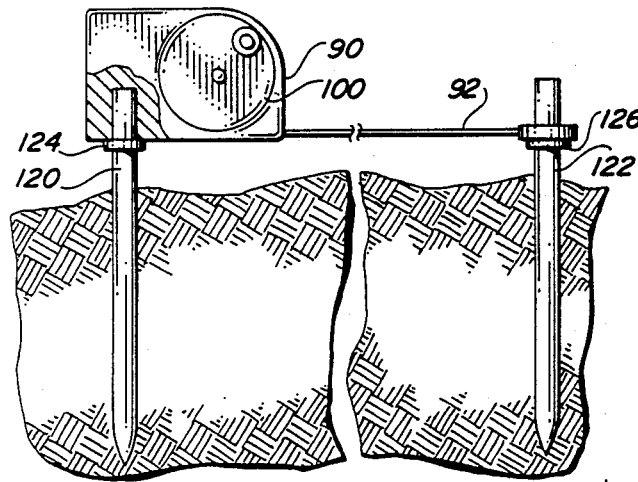
Figures 17, 18:
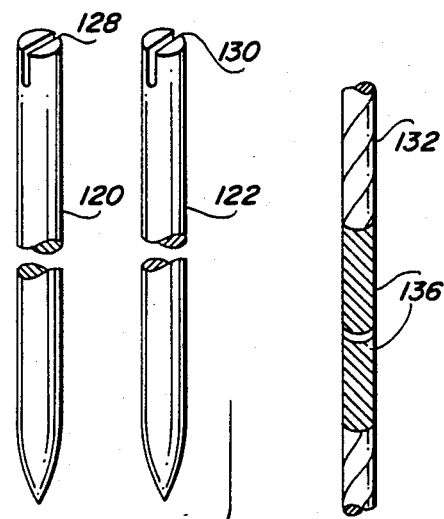
Figure 19:
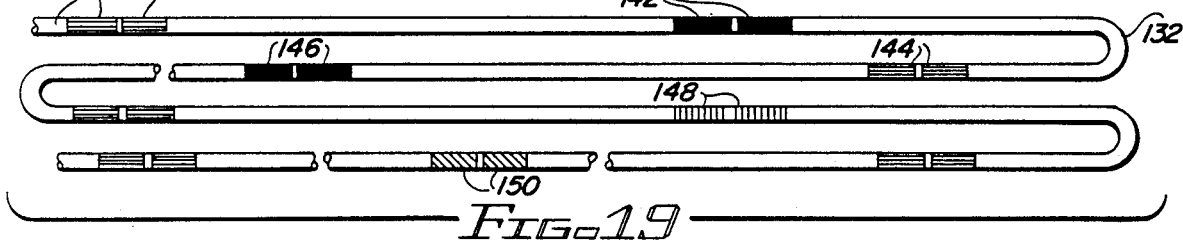

FIGS. 4, 5 and 6 illustrate an alternate embodiment of the inventive auger-like apparatus. Again, a spiral blade or screw flight 36 having a radially extending sharpened cutting edge 38 is fixedly coupled to a lower portion of the shank 40. Spiral blade 36 completes substantially a full turn around shank 40, and a guard member 42 extends from a portion of the periphery 44 of blade 36 adjacent trailing edge 46 to a second portion of the periphery 48 proximate cutting edge 38. Guard 42 functions in the same manner as did blade portion 26 in FIG. 1. That is, should the auger-like apparatus strike or encounter a hose or sprinkler conduit, guard 42 will push the hose or conduit aside thus preventing damage thereto. It should be clear that shank 40 may be provided with graduations and a snap ring as was shown in FIG. 1.

Thus, there has been described a planting and measuring system including an auger-like apparatus and a measuring gauge which assures not only the depth and diameter of the planting holes, but also the consistency of the spacing therebetween. Means are provided to prevent damage to sprinkling conduits, hoses and the like which might reside in the path of the auger-like apparatus during the drilling process.

The above description is given by way of example only. Changes in form and detail may be made by one skilled in the art without departing from the scope of the invention as defined by the appended claims.

I claim:

1. An apparatus for boring planting holes in the ground in an environment which may contain submerged conduits, hoses, and the like, said apparatus comprising:

an elongate shank having first and second ends;

a spiral blade fixedly coupled to said shank proximate said first end, said spiral blade having an outer periphery, a trailing edge, and a cutting edge; and first means proximate said cutting edge for protecting said submerged conduits, hoses and the like, said first means including a guard member extending from a first portion of said outer periphery adjacent said cutting edge to a second portion of said outer periphery adjacent said trailing edge.

2. An apparatus for boring planting holes in the ground in an environment which may contain submerged conduits, hoses, and the like, said apparatus comprising:

a graduated, elongate shank having first and second ends;

a spiral blade fixedly coupled to said shank proximate said first end, said spiral blade having a cutting edge; and first means proximate said cutting edge for protecting said submerged conduits, hoses and the like; and second means, slidably supported on said graduated shank, for cooperating with said shank to indicate depth.

3. An apparatus according to claim 2 wherein said second means in a snap ring.

* * * * *

UNITED STATES PATENT AND TRADEMARK OFFICE
CERTIFICATE OF CORRECTION

PATENT NO. : 4,986,368

DATED : Jan. 22, 1991

INVENTOR(S) : John P. Underwood

It is certified that error appears in the above-identified patent and that said Letters Patent are hereby corrected as shown below:

On the Title page, Item [76], delete "Dan B. Poole, 14645 N. 15th Ave., Phoenix, Ariz. 85023".

In the Figures, delete pages 2 and 3, Figs. 7-19 inclusive.

Signed and Sealed this

Thirtieth Day of June, 1992

*Attest:*

DOUGLAS B. COMER

*Attesting Officer*     *Acting Commissioner of Patents and Trademarks*